United States Patent [19]
Barma et al.

[11] Patent Number: 5,106,538
[45] Date of Patent: * Apr. 21, 1992

[54] CONDUCTIVE POLYMER COMPOSITION

[75] Inventors: Pradeep Barma, Fremont; Chi-Ming Chan, Cupertino; Manoochehr Mohebban, Foster City, all of Calif.; Nachum Rosenzweig, Kfar Vradin, Israel; Eugen L. Kurjatko, Redwood City, Calif.

[73] Assignee: Raychem Corporation, Menlo Park, Calif.

[ * ] Notice: The portion of the term of this patent subsequent to Apr. 21, 2009 has been disclaimed.

[21] Appl. No.: 459,722

[22] PCT Filed: Jul. 21, 1988

[86] PCT No.: PCT/US88/02484
§ 371 Date: Jan. 11, 1990
§ 102(e) Date: Jan. 11, 1990

[87] PCT Pub. No.: WO89/00755
PCT Pub. Date: Jan. 26, 1989

Related U.S. Application Data

[63] Continuation-in-part of Ser. No. 75,929, Jul. 21, 1987, Pat. No. 5,106,540, which is a continuation-in-part of Ser. No. 818,846, Jan. 14, 1986, abandoned, and a continuation-in-part of Ser. No. 818,845, Jan. 14, 1986, abandoned.

[51] Int. Cl.$^5$ .............................................. H01B 1/06
[52] U.S. Cl. ............................ 252/511; 252/503; 252/506; 252/504; 252/518; 252/520; 252/516
[58] Field of Search ................ 252/511, 515, 503, 504, 252/506, 507, 516, 518, 520; 524/495, 496

[56] References Cited

U.S. PATENT DOCUMENTS

| | | |
|---|---|---|
| 3,591,526 | 7/1971 | Kawashima et al. ............... 252/511 |
| 3,658,976 | 4/1972 | Slade ..................................... 264/105 |
| 4,051,075 | 9/1977 | Smith-Johannsen et al. ...... 252/511 |
| 4,055,615 | 10/1977 | Ikeda ................................... 264/105 |
| 4,151,126 | 4/1979 | Adelman et al. ................... 252/508 |
| 4,351,746 | 9/1982 | Parish et al. ........................ 252/511 |
| 4,388,607 | 6/1983 | Toy et al. ............................ 338/22 SD |
| 4,514,620 | 4/1985 | Cheng et al. ........................ 219/553 |
| 4,518,552 | 5/1985 | Matsuo et al. ...................... 264/126 |
| 4,560,498 | 12/1985 | Horsma et al. ..................... 252/511 |
| 4,591,700 | 5/1986 | Sopory ................................ 219/505 |

FOREIGN PATENT DOCUMENTS

| | | |
|---|---|---|
| 038718 | 10/1981 | European Pat. Off. . |
| 138424 | 4/1985 | European Pat. Off. . |
| 179265 | 4/1986 | European Pat. Off. . |

(List continued on next page.)

Primary Examiner—Josephine Barr
Attorney, Agent, or Firm—Timothy H. P. Richardson; Marquerite E. Gerstner; Herbert G. Burkard

[57] ABSTRACT

A composition which comprises a matrix polymer and, distributed therein, a particulate conductive filler. At least some of the filler particles are composed of a conductive polymer composition and/or the matrix comprises a sintered polymer. The matrix polymer and the filler particles and the method of distributing the particles are such that the particles maintain their identity in the matrix. For example, the particles are preferably highly cross-linked so that they have a hot modulus of at least 250 psi if the composition is prepared by melt extrusion or another process involving a high degree of shear; or a low-shear process such as sintering can be used. Preferably the matrix polymer is capable of coating the filler particles; for example, the matrix polymer and the filler polymer may be chemically similar. The invention is particularly useful for preparing compositions which have high resistivities, e.g. 1000 ohm.cm or more, and which can be prepared with a high degree of reproduceability. The compositions can exhibit PTC, ZTC or NTC behavior, depending on the nature of the conductive filler, and their resistivity is dependent on the electric field. The composition are particularly useful as resistive materials in sheet heaters and as stress-grading materials for high voltage apparatus.

21 Claims, 3 Drawing Sheets

FOREIGN PATENT DOCUMENTS

| | | |
|---|---|---|
| 181587 | 5/1986 | European Pat. Off. . |
| 189128 | 7/1986 | European Pat. Off. . |
| 231068 | 8/1987 | European Pat. Off. . |
| 1810829 | 7/1969 | Fed. Rep. of Germany . |
| 3107489A | 9/1982 | Fed. Rep. of Germany . |
| 2238733 | 7/1974 | France . |
| 51-32983 | 3/1976 | Japan . |
| 59-122524 | 7/1984 | Japan . |
| 60-115678 | 6/1985 | Japan . |
| 63-123665 | 6/1986 | Japan . |
| 62-37903 | 2/1987 | Japan . |
| WO89/00098 | 1/1989 | PCT Int'l Appl. . |
| 435003 | 8/1984 | Sweden . |
| 1195076 | 6/1970 | United Kingdom . |
| 1457157 | 12/1976 | United Kingdom . |
| 2065430A | 6/1981 | United Kingdom . |

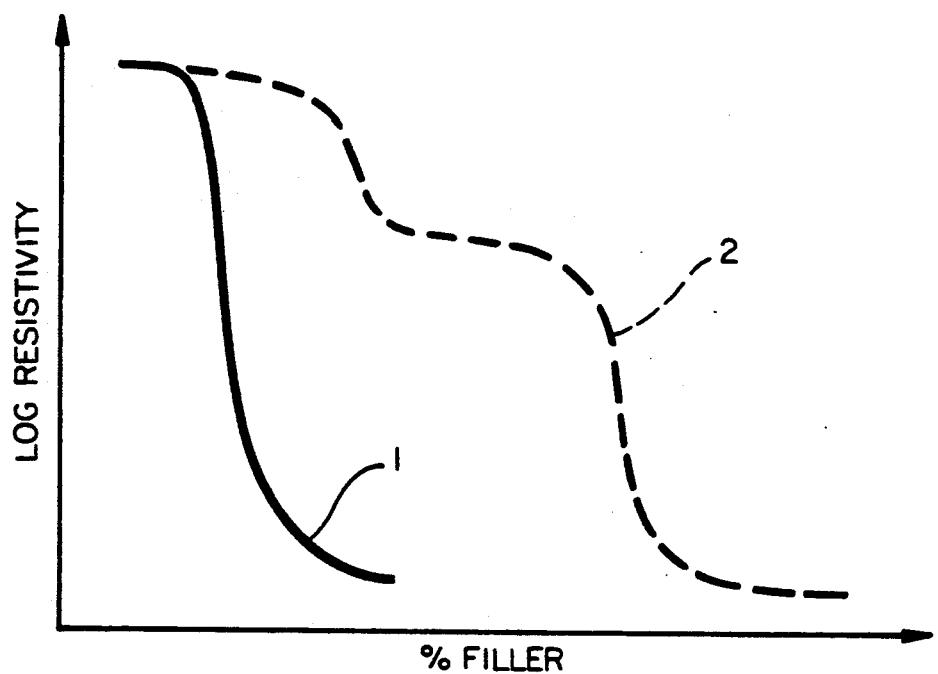
FIG_1
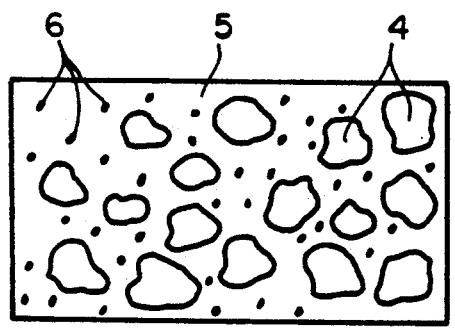
FIG_2
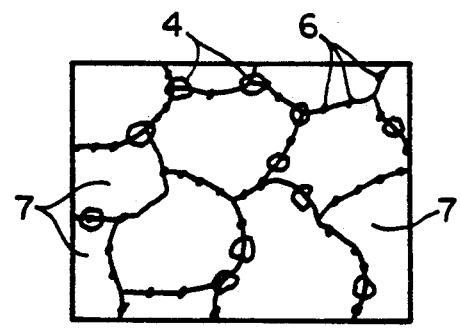
FIG_5

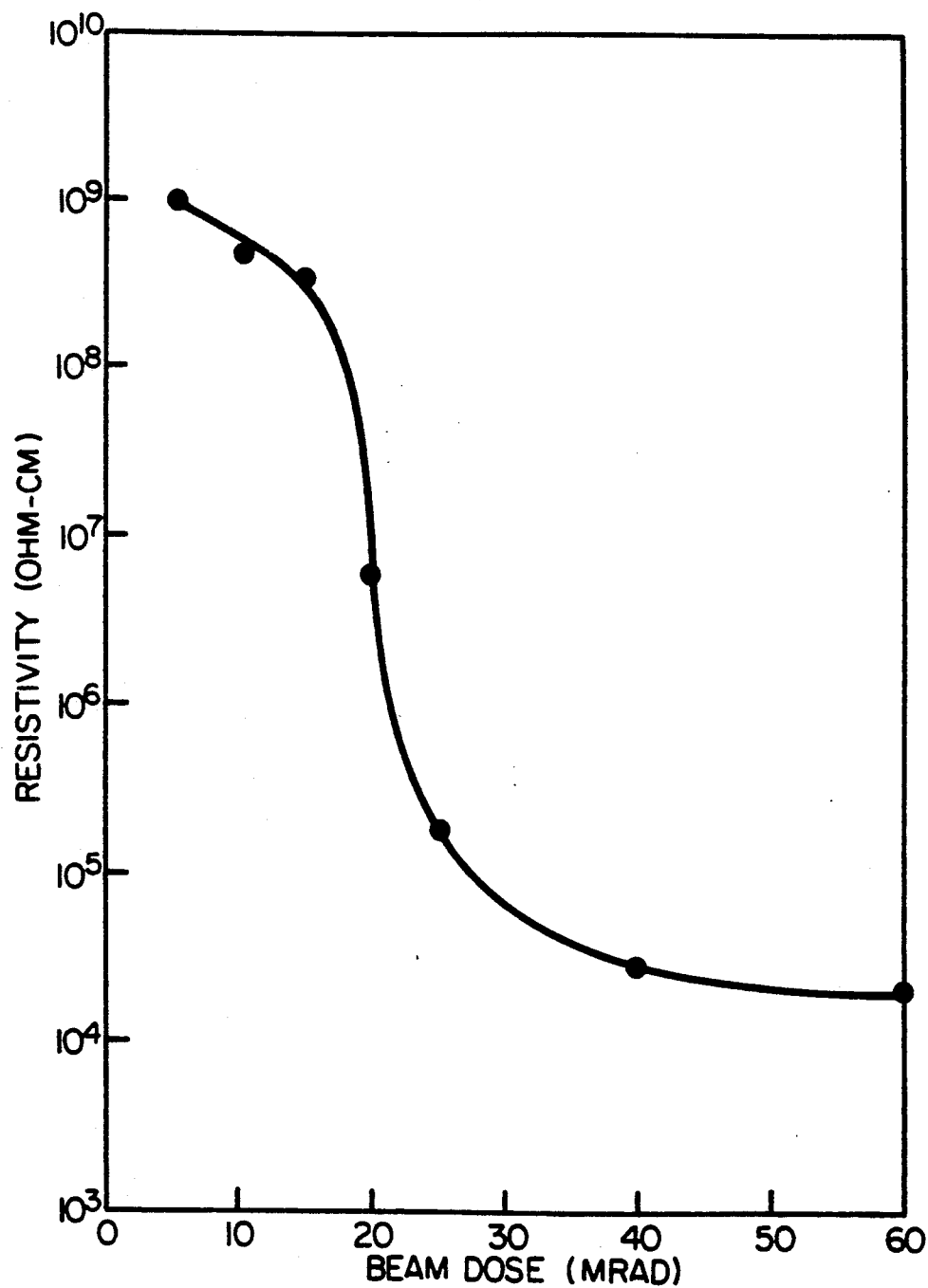
FIG_3

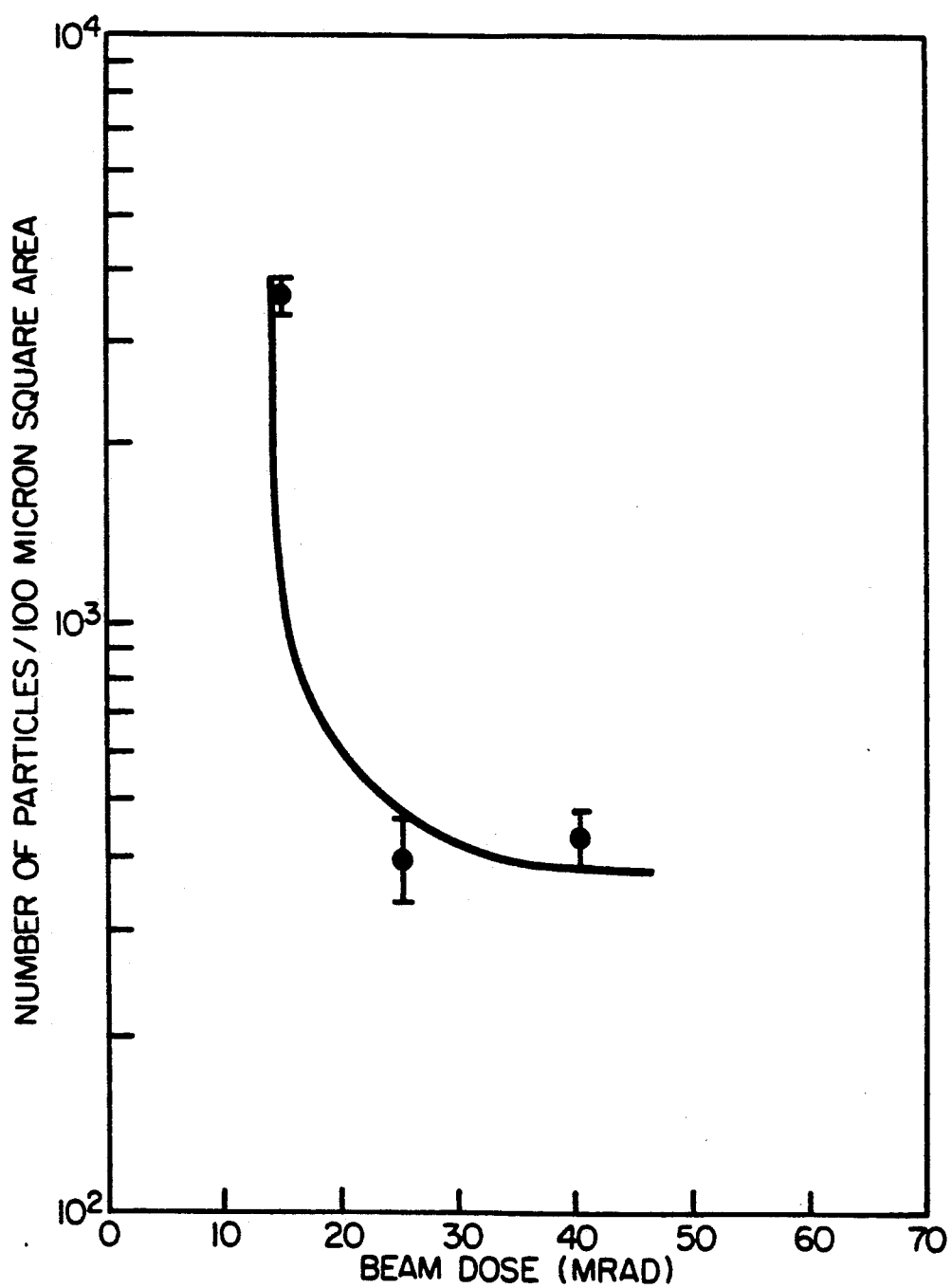
FIG_4

CONDUCTIVE POLYMER COMPOSITION

CROSS-REFERENCE TO RELATED APPLICATIONS

This application is a U.S. equivalent of copending, commonly assigned International Application No. PCT/US88/02484, filed Jul. 21, 1988 by Barma, Chan, Mohebban, Rosenzweig, and Kurjatko, which is a continuation-in-part of copending, commonly assigned application Ser. No. 75,929 filed Jul. 21, 1987 by Barma, Chan, Mohebban and Rosenzweig, now U.S. Pat. No. 5,106,540, which is itself a continuation-in-part of copending commonly assigned application Ser. No. 818,846 filed Jan. 14, 1986 by Pradeep Barma now abandoned and of commonly assigned application Ser. No. 818,845 filed Jan. 14, 1986, by Nachum Rosenzweig, now abandoned. The entire disclosure of each of those applications is incorporated herein by reference.

BACKGROUND OF THE INVENTION

1. Field of the Invention

This invention relates to conductive polymer compositions comprising a particulate conductive filler which is distributed in an organic polymer.

2. Introduction to the Invention

Conductive compositions comprising a particulate conductive filler distributed in an organic polymer {this term being used herein to include polysiloxanes) are known. Such compositions are known as "conductive polymer compositions". Documents describing conductive polymer compositions and devices comprising them include U.S. Pat. Nos. 2,952,761, 2,978,665, 3,243,753, 3,351,882, 3,571,777, 3,591,526, 3,757,086, 3,793,716, 3,823,217, 3,858,144, 3,861,029, 3,950,604, 4,017,715, 4,072,848, 4,085,286, 4,117,312, 4,177,376, 4,177,446, 4,188,276, 4,237,441, 4,242,573, 4,246,468, 4,250,400, 4,252,692, 4,255,698, 4,271,350, 4,272,471, 4,304,987, 4,309,596, 4,309,597, 4,314,230, 4,314,231, 4,315,237, 4,317,027, 4,318,881, 4,327,351, 4,330,704, 4,334,351, 4,352,083, 4,361,799, 4,388,607, 4,398,084, 4,413,301, 4,425,397, 4,426,339, 4,426,633, 4,427,877, 4,435,639, 4,429,216, 4,442,139, 4,459,473, 4,470,898, 4,481,498, 4,476,450, 4,502,929, 4,514,620, 4,517,449, 4,529,866, 4,534,889, 4,545,926, 4,562,313, 4,570,055, 4,582,983, 4,591,700, 4,624,990, and 4,661,687; J. Applied Polymer Science 19, 813–815 (1975), Klason and Kubat; Polymer Engineering and Science 18, 649–653 (1978), Narkis et al; Japanese Patent Publication Nos. 51-32983, 51-32984, 57-228128, 60-115678 and 61-123665; German OLS No. 2,821,799; European Application No. 38,718; and copending commonly assigned U.S. Ser. Nos. 656,046 (Jacobs et al) now abandoned, published as European Application No. 63,440, 300,709 now abandoned and 423,589 both (Van Konynenburg et al) published as European Application No. 74,281, 832,562 (Masia et al), now abandoned in favor of a continuation application, Ser. No. 306,237, filed Feb. 7, 1989, 735,428 (Jensen et al) now U.S. Pat. No. 4,700,054, 780,524 (Batliwalla et al) now abandoned, 711,910 (Au et al.) now U.S. Pat. No. 4,724,417, 720,117 (Rosenzweig et al.) now U.S. Pat. No. 4,775,501, 720,118 (Soni et al.) published as European Application No. 157,759, 784,288 (Soni et al.) published as European Application 220,003, now U.S. Pat. No. 4,743,321, 787,218 (Matthiesen) now U.S. Pat. No. 4,689,475, 913,290 (Barma et al.) now abandoned in favor of a continuation application Ser. No. 302,103, filed Jan. 24, 1989 now U.S. Pat. No. 4,866,452, 024,738 (Cheng et al.) now abandoned in favor of a continuation-in-part application, Ser. No. 166,954, filed Mar. 11, 1988, 021,820 (Siden et al.) now abandoned, 061,353 (McMills), 064,354 (McMills) now abandoned in favor of a continuation application, Ser. No. 394,288, filed Aug. 15, 1989, 064,287 (Wasley et al.) and 061,259 (McMills et al.) now abandoned in favor of continuation-in-part applications Ser. No. 249,733, now abandoned, and Ser. No. 250,024, both filed Sep. 26, 1988. The disclosure of each of the patents, publications and applications referred to above is incorporated herein by reference.

Conductive polymer compositions can be used as current-carrying components, e.g. in heaters and circuit protection devices, as shielding or stress-grading components for high voltage cables and other high voltage electrical equipment, and as antistatic materials. They may exhibit what is known as PTC (positive temperature coefficient), ZTC (zero temperature coefficient) or NTC (negative temperature coefficient) behavior. The term "PTC behavior" is used in this specification to denote a composition which, in the operating temperature range, e.g. 0° to 200° C., has an $R_{14}$ value of at least 2.5 or an $R_{100}$ value of at least 10, preferably both, and which preferably has an $R_{30}$ value of at least 6, where $R_{14}$ is the ratio of the resistivities at the end and the beginning of the 14° C. temperature range showing the greatest increase in resistivity, $R_{100}$ is the ratio of the resistivities at the end and the beginning of the 100° C. temperature range showing the greatest increase in resistivity, and $R_{30}$ is the ratio of the resistivities at the end and the beginning of the 30° C. temperature range showing the greatest increase in resistivity. The term "NTC behavior" is used in this specification to denote a composition which does not show PTC behavior in the operating temperature range, and whose resistivity at 0° C. is at least 2 times, preferably at least 5 times, its resistivity at a higher temperature in the operating range. The term "ZTC behavior" is used in this specification to denote a composition which does not show either PTC behavior or NTC behavior; ZTC compositions can exhibit PTC behavior at temperatures above the operating temperature range of the composition.

The conventional method of preparing conductive polymer compositions comprises dispersing a homogeneous conductive particulate filler in a heated polymeric matrix (the term "homogeneous filler" is used herein to denote a filler in which each particle has a single phase, e.g. carbon black, graphite, a metal, a metal oxide, a ceramic or another conductive inorganic material). This conventional method can be used to make a wide variety of products. However, for many combinations of polymeric matrix and conductive filler, it is extremely difficult to obtain reproducible results in some of the resistivity ranges of interest. The reason for this is that the "loading curve", i.e. a graph of the log of the resistivity of the composition against the volume per cent of the filler, invariably has a short relatively flat upper portion corresponding to the resistivity of the matrix polymer and then falls steeply until it flattens out as the resistivity of the composition approaches an asymptotic value. Such a loading curve is shown as Curve 1 of FIG. 1. If the desired resistivity falls on the steep portion of the loading curve, the resistivity of the product can change very significantly if there are small changes in the process conditions or the starting materials. For example, a resistivity on the steep part of the loading curve is desired where the conductive polymer is a carbon black loaded, polymeric PTC composition for use in a PTC heater which comprises a laminar PTC heating element sandwiched between laminar electrodes and which is powered by a relatively high voltage (typically greater than 100V) power source. For such use, a resistivity (at 23° C.) of $10^3$ to $10^6$ ohm.cm is desirable, inter alia to avoid high and damaging "inrush" currents when the composition is first powered.

Another known method of preparing a conductive polymer composition is to dry blend carbon black and a powdered polymer, and to sinter the resulting blend so that the polymer particles coalesce but do not lose their identity. Such methods are very useful for the production of ZTC conductive polymers based on polymers which cannot be melt processed, e.g. ultra-high molecular weight polyethylene (see for example Ser. No. 720,117), but are not otherwise widely used.

U.S. Pat. No. 3,591,526 (Kawashima) and Japanese Patent Publication Nos. 51-32983 and 51-32984 disclose conductive polymer compositions in which the conductive filler is not a homogeneous material, but rather is a composite filler made by melt-blending carbon black with a thermoplastic polymer to make a PTC composition, and then reducing the blend to finely divided form. The composite fillers disclosed in these references contain high loadings of the carbon black, and the compositions contain high loadings of the composite filler. Consequently the compositions have low resistivities both on an absolute scale (for carbon black containing conductive polymers), i.e. of the order of 100–200 ohm.cm or less at 23° C. and as a function of the resistivity of the filler itself, i.e. about 10 times the resistivity of the filler or less. The compositions are disclosed as being useful as resistors.

SUMMARY OF THE INVENTION

We have been carrying out research and development into conductive polymers in which the particulate conductive filler is at least in part a composite filler, this term being used herein to denote a particulate conductive filler in which each particle comprises an organic polymer and, distributed therein, a homogeneous conductive filler. Thus the conductive polymer compositions in question comprise
(a) a continuous matrix comprising a first organic polymer (also referred to herein as the matrix polymer), and
(b) a first particulate conductive filler (often referred to herein as the composite filler) which is distributed in the matrix and maintains its identity therein, and each particle of which comprises a second organic polymer (often referred to herein as the filler polymer) and a second particulate conductive filler which is distributed in the second polymer.

We have also been carrying out research and development into conductive polymers in which a particulate conductive filler is distributed in a matrix comprising organic polymer particles which have been sintered together so that the particles have coalesced without completely losing their identity.

In carrying out this work, we have made a number of very interesting and useful discoveries which are not disclosed or suggested in U.S. Pat. No. 3,591,526 and Japanese Patent Publication Nos. 51-32983 and 51-32984, or elsewhere in the prior art.

These discoveries include the following:

(1) The loading curve for a composite filler can have a different shape from the conventional loading curve described above; in particular, the steep part of the curve is interrupted by an intermediate portion which is much less steeply sloped and may be substantially flat, for example has a slope between −0.25 and zero. Such a loading curve is shown as Curve 2 in FIG. 1. This discovery makes it possible to manufacture, with a much higher degree of reproducibility than was previously possible, conductive polymer compositions having resistivities which fall on part of the steep portion of a conventional loading curve. The compositions which can thus be manufactured have much higher resistivities than those disclosed in U.S. Pat. No. 3,591,526 (Kawashima) and Japanese Patent Publication Nos. 51-32983 and 51-32984, which fall on the lower relative flat portion of the loading curve as it approaches an asymptotic value. Conductive polymer compositions which fall on or above the intermediate portion of such a loading curve, and conductive polymer compositions which form part of such a loading curve, particularly those in which the conductive filler is a composite filler, are novel and form part of the present invention. The intermediate portion of the loading curve occurs at a value which is at least 100 times, generally at least 1,000 times, e.g. from 1,000 to 10,000 times the resistivity of the composite filler. It is believed that such a loading curve results from the use of a matrix polymer/conductive filler combination such that two different conduction mechanisms are possible, with one mechanism dominating the other (or being the only mechanism) at lower filler loadings above the intermediate portion and causing the resistivity to change rapidly, as the filler content is increased, until no more conductive paths can be set up by that mechanism, and the other mechanism providing relatively few (or no) conductive paths until the filler content reaches the higher levels below the intermediate portion, at which levels the other mechanism causes the resistivity again to change rapidly, as the filler content is increased, until no more conductive paths can be set up by that other mechanism, at which point the resistivity tends towards the resistivity of the filler itself.

(2) It is desirable to ensure that the composite filler maintains its identity in the composition, and the less the second conductive filler escapes into the matrix, the better. It is important, therefore, to bear this in mind when selecting the matrix, the composite filler and method of mixing them together. The measures suggested by Kawashima and the Japanese Publications are either inadequate to achieve the desired result and/or exclude many desirable combinations of materials and/or exclude many desirable preparative methods. The preferred method of ensuring that the second filler does not escape into the matrix is to subject the composite filler to extensive cross-linking. We have found that if a graph is made of log resistivity against cross-linking level for a series of compositions which are identical except for the cross-linking level of the composite filler, the curve falls sharply and then flattens out towards an asymptotic value. We have also found that more reproducible results are obtained, at all points on the loading curve, if the composite filler has been crosslinked to a level such that it falls on a portion of the curve of resistivity against cross-linking level whose slope is between −0.25 and zero.

(3) It is desirable to ensure that the matrix can form at least a partial coating around a substantial proportion of the particles of the composite filler, for example through the choice of a matrix having a suitable spreading coefficient on the composite filler.

(4) The compositions comprising a composite filler can have non-linear properties, i.e. a resistivity which is dependent on voltage stress, for example a resistivity which (over some useful ranges of voltage stress) decreases as the voltage stress increases, thus making the compositions very valuable as stress grading materials in those useful ranges of voltage stress.

(5) Novel and useful compositions can be made through the use of composite fillers which exhibit ZTC or NTC behavior.

(6) Novel and useful compositions can be made by distributing two or more composite fillers, or a composite filler and one or more homogeneous fillers, in the matrix.

(7) Novel and useful compositions can be made by distributing a particulate filler (which may or may not be a composite filler) which changes its resistivity in response to a change in temperature, voltage stress or frequency, in a sintered polymer matrix.

(8) Novel and useful composite fillers can be made by mixing a homogeneous conductive filler, e.g. carbon black, with a cross-linkable polymer, preferably a thermoplastic polymer, under conditions which cause cross-linking of the polymer while the mixing is taking place and which result in a particulate product. The ingredients which are mixed together preferably comprise a chemical cross-linking agent which decomposes at the mixing temperature.

(9) Novel and useful compositions can be made by a process as described in (8) above in which a composite filler is used instead of a homogeneous filler, provided that the mixing is carried out under conditions such that the composite filler retains its identity.

In one aspect the present invention provides a composition which comprises (a) a continuous matrix comprising a first organic polymer, and (b) a first particulate conductive filler which is distributed in the matrix and maintains its identity therein, and each particle of which comprises a second organic polymer, and a second particulate conductive filler which is distributed in the second polymer;

wherein at least one of the following conditions is fulfilled:

(1) the composition has a resistivity which is at least 100 times, preferably at least 1,000 times, e.g. 1,000 to 100,000, particularly 1,000 to 10,000 times, the resistivity of the first filler; this condition reflects two facts, first that at such resistivities, the composition will be on or above any relatively flat intermediate part of the loading curve, and second that prior art compositions containing composite fillers have much lower resistivities;

(2) the first particulate filler has a hot modulus (measured as described below) of at least 250 psi, preferably at least 350 psi, particularly at least 450 psi; this condition reflects the fact that the first filler is preferably extensively cross-linked, so that it can be subjected to mixing conditions which involve heating above the melting point of the second polymer, and/or extensive shearing, without allowing substantial amounts of the second conductive filler to escape into the matrix;

(3) the first polymer has a viscosity, at a temperature above its melting or softening point, which is no more than 0.2 times the viscosity of the first filler at the same temperature; this condition reflects the fact that if the first filler is relatively viscous at at least some temperatures above the melting point of the first polymer, the first polymer can be melt-mixed with the first filler without the particles of the first filler losing their identity;

(4) the second polymer has a melting or softening point which is at least 30° C. higher, preferably at least 60° C. higher, than the melting or softening point of the first polymer; this condition reflects the fact that if the melting or softening point of the second polymer is sufficiently above the melting or softening point of the first polymer, the first polymer can be melt-mixed with the first filler without the particles of the first filler losing their identity;

(5) the number of particles of the second filler in the matrix is less than 450 particles, preferably less than 400 particles, per 100 micron$^2$; the number of particles being measured by the procedure given in Example 1 below; this condition reflects the desirability of limiting the extent to which the particles of the second filler escape into the matrix;

(6) the composition comprises a third particulate filler which is distributed in the matrix; this condition reflects that very useful compositions can be made by adding one or more additional particulate fillers, which may be conductive or non-conductive;

(7) the matrix comprises particles of the first organic polymer which have been sintered together without completely losing their identity; this condition reflects the fact that novel sintered compositions can be made through the use of composite fillers;

(8) the first particulate filler exhibits ZTC or NTC behavior; this condition reflects the fact that novel compositions can be made through the use of composite fillers which exhibit ZTC or NTC behavior; and (9) the composition is in the form of a heat-recoverable article, or is in the form of a flexible tape or sheet which is free from electrodes, or is secured to or contained by a substrate which is deformable from a first configuration to a second configuration, whereby the conductive composition can be applied to a second substrate, or is associated with high voltage equipment so that it can limit electrical stress in a region of high electric field strength; this condition reflects the fact that, having discovered that compositions containing composite fillers are non-linear, it now makes sense to use such compositions to limit electrical stress in high voltage equipment, and to make such compositions into articles which can be used to apply such compositions to high voltage equipment.

In a second aspect, the invention provides a composition which comprises (a) a continuous matrix composed of a first organic polymer, and (b) a first particulate conductive filler which is distributed in the matrix and maintains its identity therein, and which is preferably a composite filler, said composition having a resistivity which is less than 0.1 times the resistivity of the first polymer and at least 100 times the resistivity of the first filler, and the method by which said composition has been prepared, and the ingredients in said composition being such that, if (i) a number of other compositions are prepared by the same method and using the same ingredients except that the volume percent of the first filler is slightly greater or slightly smaller, (ii) the resistivities of said composition and of the other compositions are measured, and (iii) a graph is made, for said composition and the other compositions, of log resistivity on the vertical axis against volume per cent of the first conductive filler on the horizontal axis, the slope of the graph, at the volume per cent filler of said composition, is between −0.25 and zero, preferably between −0.15 and zero. This aspect of the invention reflects the fact that these compositions are particularly useful, because they can be reproducibly prepared, since they fall on the relatively flat intermediate part of a loading curve.

In a third aspect, the invention provides a composition which has a resistivity of at least 1,000 ohm.cm and which comprises (a) a continuous matrix composed of a first organic polymer, and (b) a first particulate conductive filler which is distributed in the matrix and maintains its identity therein, preferably a composite filler, the method by which said composition has been prepared, and the ingredients of said composition being such that, if (i) a number of other compositions are prepared by the same method and using the same ingredients except that the volume percent of conductive filler is varied from a very small amount to the maximum amount that can be distributed in the matrix, (ii) the resistivities of said composition and of the other compositions are measured, and (iii) a graph is made, for said composition and the other compositions, of log resistivity on the vertical axis against volume per cent of the first conductive filler on the horizontal axis, there are two distinct regions of the graph in which the resistivity is less than 0.1 times the resistivity of the first polymer and the slope of the graph is between −0.25 and zero, said distinct regions being separated by a region in which the slope of the graph is less than −0.5 and in which the resistivity changes by the smaller of at least 103 ohm.cm and a factor of at least 100, preferably at least 1,000. This aspect of the invention reflects the fact that compositions which form part of a loading curve having a relatively flat intermediate portion are novel and useful.

In a fourth aspect, the present invention provides a composite particulate conductive filler in which each particle has a size less than 10 mesh, preferably less than 60 mesh, particularly less than 80 mesh (mesh sizes are standard sieve sizes), and comprises an organic polymer and a second particulate conductive filler which is distributed in the organic polymer, said composite filler having at least one of the following properties:

(1) it has a hot modulus of at least 250 psi, (2) the polymer can be melt-processed and has a melting or softening point of at least 250° C.;

(3) the polymer is amorphous; and (4) it exhibits ZTC or NTC behavior.

This aspect of the invention reflects the fact that many of the composite fillers used in making the compositions of the invention are novel per se by virtue of possessing one or more of the properties (1) to (4) enumerated above.

In a fifth aspect, the present invention provides a process for preparing a composition which comprises mixing together (a) a first organic polymer, and (b) a first particulate conductive filler in which each particle comprises a second organic polymer and a second particulate conductive filler which is distributed therein, in which process (A) the first polymer is heated above its melting point;

(B) the first particulate filler maintains its identity;

(C) the value of the quantity $$\gamma_2 - (\gamma_1 + \gamma_{12})$$

is at least 0, where $\gamma_1$ is the surface tension of the first polymer under the mixing conditions, $\gamma_2$ is the surface tension of the first filler under the mixing conditions, and $\gamma_{12}$ is the interfacial tension between the first polymer and the first filler under the mixing conditions; and (D) at least one of the following conditions is fulfilled:

(1) the amount of the first filler is such that the composition has a resistivity which is less than 0.1 times the resistivity of the first polymer and at least 100 times the resistivity of the first filler;

(2) the first particulate filler has a hot modulus of at least 250 psi;

(3) under the mixing conditions the first polymer has a viscosity which is no more than 0.2 times the viscosity of the first filler;

(4) the temperature is lower than the melting or softening point of the second polymer;

(5) a third particulate filler is also mixed with the first polymer;

(6) the process comprises mixing the first filler with particles of the first organic polymer and then sintering the mixture so that the particles of the first polymer are sintered together without completely losing their identity; and (7) the first particulate filler exhibits ZTC or NTC behavior.

In many respects, this aspect of the invention reflects, in terms appropriate to the preparation of the compositions, the same conditions as in the first aspect of the invention. Condition (C) reflects a different consideration, namely the desirability of using a matrix polymer whose spreading coefficient, ie. the quantity $\gamma_2-(\gamma_1+\gamma_{12})$, is such that, according to the theory widely employed in adhesives technology, the matrix polymer will coat the first filler particles. It may be noted that the spreading coefficient is to be ascertained under the particular process conditions. However, the stated condition is usually met under the mixing conditions if it is met at about 23° C., at which temperature the surface and interfacial tensions can be ascertained from the literature or can be more easily measured.

In a sixth aspect, the present invention provides a process for the preparation of a composition which comprises (a) a continuous matrix comprising a first organic polymer, and (b) a first particulate conductive filler which is distributed in the matrix and maintains its identity therein, and each particle of which comprises a cross-linked mixture of a second organic polymer, and a second particulate conductive filler which is distributed in the second polymer;

which process comprises (1) dispersing the second particulate conductive filler in the second organic polymer;
(2) melt-extruding the dispersion from step (1);
(3) cross-linking and comminuting the extrudate from step (2) to form a composite particulate conductive filler; and
(4) dispersing the composition from step (3) in a second organic polymer, which is preferably compatible with the first polymer;

the ingredients of the composition and the conditions of the process being such that, if (i) a number of other compositions are prepared by the same process and using the same ingredients except that the level of cross-linking. is in some cases greater than in step (3) and in other cases less than in step (3);
(ii) the resistivities of said composition and of the other compositions are measured; and
(iii) a graph is made for said composition and for the other compositions of log resistivity on the vertical axis against cross-linking level on the horizontal axis, the cross-linking level being expressed in Mrads if the cross-linking is effected by ionising radiation and in weight percent of the cross-linking agent if the cross-linking is effected by a chemical cross-linking agent, the slope of the graph, at the cross-linking level in step (3), is between −0.25 and zero, preferably between −0.15 and zero. This aspect of the invention reflects the fact that more reproduceable results are obtained if the composite filler has been extensively cross-linked.

In a seventh aspect, the invention provides a process for the preparation of a composition which comprises (a) a continuous matrix comprising a first organic polymer, and
(b) a first particulate conductive filler which is distributed in the matrix and maintains its identity therein, and each particle of which comprises a second organic polymer, and a second particulate conductive filler which is distributed in the second polymer;

which process comprises (1) dispersing the second particulate conductive filler in the second organic polymer;
(2) melt-extruding the dispersion from step (1);
(3) comminuting the extrudate from step (2) to form the first filler;
(4) dry blending the first filler from step (3) with particles of the first polymer; and
(5) subjecting the blend obtained in step (4) to heat and pressure such that
  (a) the particles of the first polymer are sintered together so that they coalesce but do not completely lose their identity, with the first filler particles being present substantially only at the boundaries of the coalesced particles, or
  (b) the particles of the first polymer melt completely.

This aspect of the invention reflects the fact that very useful results can be obtained through processes in which the composite filler is not subjected to shearing, since shearing promotes migration of the second filler from the first filler into the matrix.

In an eighth aspect, the invention provides a conductive composition which comprises (1) a matrix comprising organic polymer particles which have been sintered together so that the particles have coalesced without completely losing their identity, and
(2) a first particulate filler which
  (i) is conductive,
  (ii) is dispersed in the matrix but is present substantially only at or near the boundaries of the coalesced particles, and
  (iii) changes its resistivity in response to a change in at least one of the following variables: temperature, voltage and frequency, wherein the conductive composition as a whole also changes its resistivity in response to the change in the variable.

This aspect of the invention reflects the fact that the sintering process represents a useful route to the manufacture of a wide range of novel compositions.

In a ninth aspect, the invention provides a composition which comprises (a) a continuous matrix comprising a first organic polymer, and
(b) a first particulate conductive filler which is distributed in the matrix and maintains its identity therein, and each particle of which comprises a second organic polymer, and a second particulate conductive filler which is distributed in the second polymer;

wherein the first particulate conductive filler has been crosslinked under dynamic mixing conditions.

This aspect of the invention reflects the fact that the first particulate filler can be easily produced by chemically cross-linking at an elevated temperature under relatively high shear conditions.

The invention further includes electrical devices which comprise at least one electrode, and usually two, and a conductive polymer composition as defined through which current passes in use of the device.

BRIEF DESCRIPTION OF THE DRAWINGS

The invention is illustrated in the accompanying drawings in which

FIG. 1 is a graph diagrammatically showing the loading curves for a composition according to the present invention (Curve 2) and a composition of the prior art (Curve 1), FIG. 2 is a schematic cross-section through a composition according to the invention, comprising composite filler particles 4 and third conductive filler particles 6 distributed in a matrix 5, FIG. 3 is a graph of log resistivity against radiation cross-linking level for compositions in which the only variable is the degree of cross-linking of the composite filler, FIG. 4 is a graph of the number of particles of the second filler which have migrated into the matrix against radiation cross-linking level for compositions in which the only variable is the degree of cross-linking of the composite filler, and FIG. 5 is a schematic cross-section through a sintered composition of the invention showing composite filler particles 4 and a third conductive filler particles 6 distributed around the peripheries of sintered matrix polymer particles 7.

DETAILED DESCRIPTION OF THE INVENTION

The hot modulus values referred to herein are measured at 150° C. for polymers which do not have a melting point and at a temperature 20° C. above the melting point (i.e. the peak of a differential scanning calorimeter curve) for polymers having a melting point. The test employed measures the stress required to elongate a sample by 100% (or to cause it to break) and the modulus (or $M_{100}$ Value) is calculated from $$M_{100} = \frac{\text{stress to elongate sample by 100\%}}{\text{initial cross-sectional area of sample}}$$

or, if the sample breaks before 100% elongation, $$M_{100} = \frac{\text{stress to break sample}}{\text{initial cross-sectional area of sample}}$$

The hot modulus value of the composite filler cannot be measured directly on a composition of the invention. However, providing that the composition is not cross-linked after the matrix polymer and the composite filler have been mixed, and providing that the composite filler, if it is cross-linked, is cross-linked prior to grinding, the hot modulus value can be ascertained directly from the starting material, since it will not be changed by the mixing and shaping process. In other circumstances, or if the starting material is not available, the hot modulus value can be ascertained indirectly by designing one or more test processes which will make an article which can be tested and which has a substantially identical composition to the composite filler and by measuring the hot modulus value of the products of those test processes.

The loading curves referred to herein are drawn in a conventional way, with the logarithm of the resistivity on the vertical axis and the volume percent of the filler on the horizontal axis. The logarithms given herein are logarithms to the base 10.

Except where noted otherwise, all the resistivities referred to herein (whether in connection with a loading curve or not) are measured at 23° C. and at a field strength of 100 volts/cm, using a pulse technique with a pulse duration of 100 microseconds and a repetition rate of one per second; where the resistivity of one composition is expressed in terms of the resistivity of another composition, or the resistivities of different compositions are compared, both (or all) of the resistivities must be measured at the same field strength. Preferably the results of comparing resistivities are also true at field strengths of 1 volt/cm and/or 10 volt/cm.

While there are, as indicated by the various aspects of the invention set out above, a number of different ways of ensuring that the first filler maintains its identity in the matrix, we believe that in many situations, the method of choice will be to cross-link the second conductive filler. In this way, providing the level of cross-linking is sufficiently high, it is possible to use any combination of matrix and filler polymer, including matrix and filler polymers which are compatible with each other, in particular the same, and to shape the composition by any process, including processes in which the molten composition is subjected to shear forces, e.g. melt-extrusion, injection molding and flow molding. Thus the composite filler used in this invention is preferably made by preparing an intimate mixture comprising the second polymer and at least one homogeneous conductive particulate filler, and optionally one or more other ingredients (e.g. non-conductive fillers, antioxidants, chemical cross-linking agents, radiation cross-linking agents, etc.) cross-linking the mixture (which increases its hot-modulus), and grinding or otherwise comminuting the mixture. Suitable mixtures include those disclosed in the documents incorporated by reference therein. In one embodiment of the invention, one or both of the first and second polymers has a melting point of at least 250° C., for example is a poly(aryl)etherketone or a polyetheretherketone or another polyarylene. Such polyarylenes can be cross-linked with the aid of sulfur (see for example Chan et al. U.S. Pat. No. 4,616,056, the disclosure of which is incorporated herein by reference). The mixing is preferably carried out by a process which comprises blending the homogeneous filler with the hot filler polymer, e.g. in a melt-extrusion apparatus or on a mill. Preferably the comminution of the mixture is carried out after the cross-linking. Cross-linking can be effected by chemical cross-linking, or by irradiation with electrons or gamma rays, or otherwise, depending on the polymer employed. The cross-linking is preferably such that the cross-linked composite filler has a hot modulus of at least 250 psi (17.5 kg/cm$^2$), particularly at least 350 psi (24.5 kg/cm$^2$), especially at least 450 psi (31.5 kg/cm$^2$). Preferably the cross-linking is substantially uniform throughout the filler. When using a thermoplastic polymer which is readily cross-linked by radiation, such as polyethylene, we have obtained good results using a dosage of at least 40 Mrad, with higher dosages of at least 60 Mrad, e.g. 60 to 90 Mrad, giving yet better results. In the melt-shaped compositions which we have tested, we have found that, other things being equal, the greater the cross-linking of the composite filler, the lower the resistivity of the final composition, with the rate of change decreasing progressively as the cross-linking increases. Preferably the cross-linking level is such that it lies on a relatively flat part of a graph of log resistivity against hot modulus, and/or on a relatively flat part of a graph of log resistivity against cross-linking level (expressed in Mrads if the cross-linking is effected by ionising radiation and in weight percent of cross-linking agent if the cross-linking is effected by a chemical cross-linking linking agent), such relatively flat part preferably having a slope of more than −0.5, e.g. between −0.5 and zero, particularly more than −0.25, especially more than −0.15.

Comminution of the mixture can be carried out in any convenient way, including cryogenic grinding, and is preferably such that the average particle size (and more preferably the maximum particle size) of the composite filler, is less than 425 microns, e.g. 100 to 425 microns. The comminuted mixture can be sieved, e.g. through an 80 mesh screen, to ensure that particles over a particular size are excluded. Especially when a chemical cross-linking agent is used, it may be possible to achieve the cross-linking and comminution steps in one step by cross-linking under dynamic mixing conditions. Thus the cross-linking agent may be incorporated during the mixing of the second polymer with the second particulate conductive filler or it may be blended with pellets of previously mixed second polymer and second particulate filler and the blend then mixed under conditions which cause decomposition of the cross-linking agent. At relatively high levels of chemical cross-linking agent, i.e. at least 3% by weight, preferably at least 4% by weight, particularly at least 5% by weight, based on the weight of the total composition which is being crosslinked; i.e. the blend of the second organic polymer and the second particulate conductive filler, the extent of cross-linking will be such that the material will be brittle. (The level of cross-linking agent is substantially higher than the 1-2% conventionally used for cross-linking.) If the blend of chemical cross-linking agent, second polymer and second particulate filler is mixed at elevated temperature under dynamic conditions for sufficient time for the cross-linking to reach a sufficiently high level, the resulting mixture will fragment. Under sufficient shear conditions, the fragments will be ground into a coarse powder. The powder may be used without further treatment as the first particulate conductive filler, or it may be further ground to produce a finer particulate, or otherwise modified. For some preferred polymers such as polyethylene, useful first particulates have been produced by mixing the second polymer, second particulate filler, and chemical cross-linking agent in a Banbury mixer, although other relatively high shear dynamic mixing equipment may also be used.

The proportion of homogeneous conductive filler in the composite filler can vary widely, but is preferably selected so that it lies on a relatively flat part of a loading curve for the homogeneous filler in the second polymer, preferably a part of the graph whose slope is more than −0.5, particularly more than −0.3. The filler polymer and the homogeneous filler should be selected having regard to the desired temperature/resistivity relationship (e.g. PTC or ZTC) in the composite filler and in the final product, as disclosed in the documents incorporated herein by reference. We prefer to use carbon black as the conductive filler, and for PTC compositions we have obtained particularly good results using 35 to 50% by weight of carbon black dispersed in a crystalline polymer. When the composite filler is chemically crosslinked, higher carbon black loadings, e.g. 40 to 60% by weight, are preferred.

The filler polymer and the matrix polymer should be selected having regard to the desired physical, electrical and chemical properties of the product. Preferably they are compatible with each other (i.e. are completely miscible over a wide range of proportions when both polymers are uncross-linked). To this end, the two polymers preferably comprise similar or identical substituents, e.g. polar groups, and/or similar or identical repeating units; each polymer contains for example at least 25 mole %, preferably at least 50 mole %, particularly at least 80 mole %, of the same repeating unit. It is particularly preferred that the two polymers should be chemically identical, e.g. both the filler polymer and the matrix polymer are polyethylene. For a PTC composition it is preferred that at least one, and preferably each of the filler polymer and the matrix polymer should be a crystalline thermoplastic. For a ZTC composition, it is preferred that both the filler polymer and the matrix polymer should be an elastomer.

The composite conductive filler can also be a filler obtained by comminuting a composition of the invention comprising a matrix filler and a composite conductive filler comprising a homogeneous conductive filler. There can be two or more composite fillers distributed in the matrix polymer. There can also be a homogeneous conductive filler distributed in the matrix polymer; such a homogeneous filler preferably exhibits NTC or ZTC behavior, e.g. carbon black or graphite, but can exhibit PTC behavior, e.g. a doped barium titanate or another PTC ceramic. The average particle size of the further conductive filler, if present, is preferably at least 1 nm, e.g. 5 to 100 nm. For ease of comminuting, an inert filler, e.g. zinc oxide, titanium dioxide, glass, alumina or other material, an organic material, e.g. a polymer which is incompatible with the second polymer, or additional conductive filler may be added to the composite conductive filler. The presence of the additional filler increases the brittleness of the composite filler and improves the ease of grinding, particularly for soft or elastomeric polymers or those which have low melting temperatures. Particulates which are produced from compositions comprising an inert filler often have a uniform size and shape when ground.

The amount of composite filler which is present in the compositions of the invention can vary widely, particularly if the composition also has a homogeneous conductive filler distributed therein. Preferably the conductive filler content is such that it lies on a relatively flat part of the loading curve, preferably a part of the graph whose slope is more than −0.5, particularly more than −0.3, especially more than −0.25, e.g. more than −0.15. When a composite filler is used alone in a shear-processed composition, the content thereof may be for example 40 to 80% by weight, preferably 55 to 75% by weight. When a composite filler is used alone in a sintered composition, the content thereof is preferably at least 20% by volume. When both a composite filler and a homogeneous conductive filler are present in a shear-processed composition, the content of composite filler may for example be 1 to 40% by volume, preferably 15 to 25% by volume, and the content of homogeneous filler may be for example up to 10% by volume, e.g. 3 to 5% by volume.

The composition can also contain other ingredients distributed in the matrix polymer, e.g. one or more non-conductive fillers. For example, if the composition is to be used for stress control, it may contain one or more ingredients appropriate to such compositions such as for example silicon carbide, iron oxide, aluminum flakes, carbon black and the other fillers referred to in U.S. Pat. No. 4,470,898 incorporated herein by reference.

For many purposes, the composite filler is preferably dispersed in the first polymer by melt-mixing, and the mixture is shaped by melt-shaping. When the composition is made by the process of the seventh aspect of the invention in which the particles of the first polymer are melted completely, the dry blend of first polymer particles and composite filler is preferably formed into a layer on a substrate which supports the layer while the first polymer is molten. The substrate is preferably a sheet electrode, e.g. a metal foil. Preferably a second sheet electrode, e.g. a metal foil, is placed on top of the layer prior to subjecting the assembly to heat and pressure. The foil is preferably one having a rough surface adjacent the conductive polymer, as disclosed in Ser. No. 787,218. These steps can be accomplished on a continuous basis by drawing the sheet electrodes from rolls, applying the dry blend to one of the electrodes, and then passing the electrode bearing the layer and the other electrode through heated nip rollers. In order to prevent the electrodes from getting too close to each other, either during preparation or in use, an insulating apertured separating member is preferably included between the electrodes, for example is placed on the electrode before the dry blend is applied thereto.

After the composition has been shaped, it can if desired be cross-linked, preferably by irradiation, in order to improve its electrical and mechanical stability, particularly at elevated temperatures.

SINTERED COMPOSITIONS

This section is concerned with the compositions made by sintering a dry blend of the matrix polymer and the composite filler. In such compositions, the conductive particles are present substantially only at the particle boundaries. This means that when an electric current is passed through the composition, ohmic heating occurs substantially only at the boundaries and not inside the matrix particles. This enhances the thermal stability of the matrix and hence the composition as a whole. Also to achieve a desired conductivity level in a conductive polymer composition, less filler is required in a sintered composition, in which the filler is concentrated at the particle boundaries, than in a non-sintered composition, in which the filler is more uniformly dispersed.

Preferably the sintered composition according to the invention comprises a second particulate filler which
(i) is conductive, and
(ii) is dispersed in the matrix but is present substantially only at or near the boundaries of the coalesced particles.

For ease of definition, the first particulate filler and the second particulate filler (if present) are stated herein to be present substantially only at or near the boundaries of the coalesced particles, and in preferred compositions they are the sole conductive particles in the composition. However, it is to be understood that the invention includes compositions which contain additional conductive particles; for example, the sintered particles themselves may comprise particles which are composed of an organic polymer having conductive particles uniformly dispersed therein, and those conductive particles can be the same as or different from either the first or the second particulate filler.

When the first particulate filler changes its resistivity in response to a change in temperature of another variable, the composition also changes its resistivity. The resistivity change of the overall composition may be the same as, or different from, the change in resistivity of the first particulate filler. Where the resistivity change of the first particulate filler shows a sharp change at a certain value of the variable, the composition preferably also shows a sharp change in its overall resistivity at the same value of the variable.

The first particulate filler may comprise any suitable material which changes its resistivity in response to a change in a variable. In one preferred embodiment, the filler comprises a conductive composition composed of a conductive polymer comprising a conductive filler dispersed in a crystalline organic polymer. Preferably the conductive polymer of the filler is one which exhibits PTC behavior. Such a filler can be used in a composition which changes its resistivity in response to a change in temperature. Preferably the first particulate filler (a) is composed of a conductive polymer which exhibits PTC behavior with a switching temperature which can be designated $T_s$particle, and (b) maintains its integrity within the matrix at temperatures up to $T_s$particle and above. Preferably the conductive polymer composition of the first particulate filler comprises carbon black dispersed in a crystalline organic polymer. In other preferred embodiments in which the composition exhibits PTC behavior, the first filler comprises a non polymeric material which exhibits PTC behavior, for example barium titanate.

A composition according to the invention containing a first particulate filler comprising another filler (for example carbon black) dispersed in an organic polymer, may itself be pulverized, and used as the first particulate filler in another composition according to the invention. That new composition may itself be pulverized and used as the first filler in yet another composition according to the invention: and so on.

The first particulate filler may be obtained by any suitable route. In one preferred embodiment it is made by pulverizing a melt-extruded conductive polymer composition.

The sintered matrix polymer may comprise any suitable polymer. As examples of polymers that may be used there may be mentioned polyethylenes, including polyethylenes having a weight average molecular weight in the range 50,000 to 8 million. A preferred polymer to use is cross-linked polyethylene having a molecular weight of about 100,000, or polyethylene, either cross-linked or uncross-linked, having a molecular weight in the range 3 to 6 million. As other examples of polymers that may be used there may be mentioned fluoropolymers, for example polytetrafluoroethylene, polyvinylidene fluoride (Kynar), polyphenylenesulfide, polyetherether ketones (PEEK), polyaryleneetherketones and polyimides.

When the first particulate filler comprises a conductive polymer composition, the polymer therein, which is designated the filler polymer, can be a single polymer or a mixture of polymers, and the particulate conductive filler therein can be a single filler or a mixture of fillers. Suitable conductive polymers are disclosed in the documents incorporated by reference herein. The sintered matrix polymer and the filler polymer are preferably compatible with each other. We have found that the greater the degree of compatibility, the more closely the change in resistance of the composition as a whole follows the change in resistivity of the filler. Particularly is this so when a second filler, e.g. carbon black, is present and the filler polymer will "wet" the second filler. Compatibility between the filler and matrix polymers can be achieved in different ways, including in particular the use of polymer which comprise similar or identical substituents, e.g. polar groups, and/or repeating units. Thus the filler and matrix polymers can, for example, each comprise at least 25%, preferably at least 50%, particularly at least 80%, of the same repeating unit. Particularly preferred compositions are those in which the filler and matrix polymers are chemically substantially identical, e.g. both are polyethylene; in this case, the filler and matrix polymers can be of the same or different molecular weights and one or both of them can be cross-linked. In any event, they should preferably be selected so that the first filler maintains its physical identity in preparation and use of the composition sufficiently to ensure that the electrical characteristics of the composition remain substantially unchanged in use. Examples of combinations where different polymers are used are polyvinylidene fluoride based particles contained in a polytetrafluoroethylene matrix, polyphenylenesulfide based particles contained in a polyetheretherketone matrix, and polyetheretherketone based particles contained in a high molecular weight polyimide matrix.

Since the sintering process is a no-shear process, the first particulate filler can maintain its integrity within the matrix, even when it comprises a conductive polymer which is the same as the polymer of the matrix. If desired the integrity of each of the polymeric components can be enhanced by controlling the viscosities of each of the polymers. This may be achieved, for example, by cross-linking one or both of the polymers. Where the first particulate filler comprises a polymeric material, that material may have a higher viscosity than the matrix polymer, or vice versa.

The relative sizes and quantities of each of the conductive fillers are chosen according to the desired resistivity. Preferably the particle size of the second filler (when present) has an average dimension of at least 1 nm, particularly in the range 5 nm to 100 nm, and the first filler has an average dimension of at least 1 nm, particularly at least 20 microns. The average dimension of the first particulate filler is preferably no more than half the size of the sintered matrix particles. Typically the average dimension of the sintered matrix particles is in the range 200 to 500 microns. Preferably the second filler (when present) constitutes no more than 10 volume per cent of the composition. Preferably the first filler constitutes 1 to 40 volume per cent of the composition. When there is some second filler present, the first particulate filler preferably constitutes 15 to 25, especially about 20, volume per cent of the composition. When there is no second filler present the first particulate filler preferably constitutes more than 30 volume per cent of the composition. There may be more first filler present than second filler, or vice versa. In one embodiment the composition comprises about 20 volume per cent of first particulate filler, and about 3 to 5 volume per cent of second particulate filler.

If the first particulate filler is non polymeric, for example a ceramic, it cannot "wet" the surface of the second filler (when present) to interrupt the conductive paths. In these cases the particle size of each of the first and second filler is preferably about the same. This enables the second filler to intermingle with the first filler to interrupt the current path.

The second particulate filler changes its resistivity in response to a change in a variable. If desired more than one filler which changes its resistivity in response to a change in a variable may be included in the composition. Where more than one such filler is included the fillers may change their resistivity in response to a change in the same variable, or in response to a change in different variables.

Referring now to FIG. 5, this is a schematic representation of a cross-section through a composition according to the invention. The matrix polymer comprises sintered ultra high molecular weight polyethylene particles 2. Two fillers are distributed in the matrix along the boundaries of the particles 2. The first filler 4 comprises carbon black, and the second filler 6 comprises a PTC conductive polymer composition comprising carbon black dispersed in polyethylene (formed by melt-extrusion). The polymer 2 and the polymer of composition 6 are compatible.

The invention is illustrated by the following Examples.

EXAMPLE 1

A material of the invention was prepared in the following way.

A composite filler was prepared in a Banbury mixer by melt-blending 56 wt % high density polyethylene (Marlex 50100, available from Phillips Petroleum) with 43 wt % carbon black (Statex G, available from Columbian Chemicals) and 1 wt % antioxidant. The compound was extruded into strands through a die and irradiated to doses ranging from 10 to 80 Mrad using a 1 MeV electron beam. The strands were then cryogenically pulverized until all the particles were smaller than 250 microns.

For each different irradiation dose, 67.5 wt % of the composite filler was tumble-blended with 32.5 wt % high density polyethylene powder (FA750, available from U.S.I. Chemicals, particle size 20 microns, melt index 22 g/10 min). The blend was then extruded into a 0.030 by 3.0 inch (0.076 by 7.62 cm) tape. One mil (0.0025 cm)-thick electrodeposited copper foil electrodes were laminated on opposite sides of the tape and the resistance was measured at 100 VDC through the thickness of the sample. The switching temperature, $T_s$, was 120° C.

Testing was conducted at two stages of the processing. The modulus ($M_{100}$, i.e. the value in psi required to stretch the sample at 150° C. to 100% of its original length) was measured on slabs compression-molded from the PTC particulates following irradiation of the particulates to different beam doses. The $M_{100}$ value in psi was plotted as a function of irradiation level of the particulates, as shown in FIG. 3.

The second test determined the amount of carbon black present in the matrix phase of the blended composition. Sections of the extruded tape were cooled in liquid nitrogen and cryosectioned with a microtome to give samples less than 1000 Angstroms thick. Using a transmission electron microscope (TEM) at 5000× magnification, the number of carbon black particles (i.e. black dots) in the polymer matrix was counted. The number of carbon particles in a 100 square micron area of polymer matrix was plotted as a function of beam dose of the PTC particulate, as shown in FIG. 4.

EXAMPLE 2

Composite filler was obtained as in Example 1, except that ethylene vinyl acetate (Elvax 4260, a copolymer with a vinyl acetate content of 28%, available from DuPont) was used in place of the high density polyethylene. After irradiating to 60 Mrad, the material was ground to a particle size of less than 250 microns and the particulates were blended with high density polyethylene. The resulting composition had a switching temperature, $T_s$, of 75° C.

EXAMPLE 3

Composite filler was made as in Example 1, except that low density polyethylene (Petrothene NA 140, available from U.S.I. Chemicals) was used. The composition was irradiated to 60 Mrad, ground to a particle size of less than 250 microns, and then blended with high density polyethylene. The resulting composition had a switching temperature, $T_s$, of 90° C.

EXAMPLE 4

The composite filler of Example 1, crosslinked to 60 Mrad, were blended with a low melt index high density polyethylene (FA 113, available from U.S.I. Chemicals, particle size 20 microns, melt index 5 g/10 min).

EXAMPLE 5

A composite filler was obtained by blending polyetheretherketone powder (available from ICI) with 40 wt % carbon black (Statex G, available from Columbian Chemicals) and 0.25 wt % elemental sulfur. The blend was mixed in a 33 mm Leistritz counterrotating twin screw extruder and was extruded through a pelletizing die. The pellets were heat-treated at 300° C. for 4 days to complete the cross-linking reaction and were then ground into a fine powder with a particle size less than 250 microns. Plaques were made by dry blending 70 wt % of the composite filler with 30 wt % of PEEK powder, and compression molding the blend between two electrodeposited nickel foil electrodes. The resulting heaters were powered by a 400 volt AC power source and heated to a switching temperature, $T_s$, of about 335° C.

EXAMPLE 6

A composite filler as described in Example 1 was prepared and was irradiated to 80 Mrad with a 3.5 MeV electron beam prior to grinding to less than 250 microns. Approximately 35 wt % of this composite filler was blended in a Sigma mixer for approximately 20 minutes at 175° C. with a black mastic consisting of polyisobutylene, amorphous polypropylene, a hydrocarbon tackifier, an antioxidant, and carbon black. The mixture was then suspended in a solvent or melted to apply to the inner surface of a tube for stress-grading applications.

EXAMPLE 7

A composite filler and a polyethylene powder as described in Example 1 were dry-blended. The blend was then sprayed onto an 0.030 inch (0.076 cm) thick, open-mesh (0.25 inch (0.635 cm) square pores), electrically insulating crosslinked polyethylene or fiberglass fabric placed on top of an electrodeposited copper foil. A second copper foil was laminated to the top of the assembly as it passed through two rolls heated to 232° C., a temperature sufficient to melt and fuse the polyethylene powder. The resulting heater had a polymer cross-section of 0.040 inch (0.102 cm).

EXAMPLE 8

A composite filler was prepared by melt blending high density polyethylene with 40% by volume of carbon black, Statex G. The mixture was pulverized until more than 90% of the particles were within the size range of 140 to 325 mesh. Then the composite filler was irradiated to 6 megarads by means of an electron beam.

77% by volume of Ultra High Molecular Weight Polyethylene (UMHWPE) (Hostalen GUR-212, made by Hoechst) was blended with 3% by volume of Statex-G carbon black and 20% by volume of the PTC powder. The blend was cold compacted, then sintered at 200° C. for 20 minutes, and finally cooled under pressure. The product was exposed to 10 megarads of high energy electrons.

The product had a resistivity of about 100 ohm-cm, at 23° C., about 1000 ohm-cm at 112° C., and about 100,000 ohm-cm at about 120° C.

EXAMPLE 9

The procedure used in Example 2 was carried out, but the volume fractions of the components were:

| UHMWPE | 93.8% |
| Composite filler | 4.2% |
| STATEX G | 2.0% |

The product had a resistivity of about 1300 ohm-cm at 23° C., about 10,000 ohm-cm at 112° C. and about 1,000,000 ohm-cm at 120° C.

EXAMPLE 10

The procedure used in Example 2 was carried out, but the volume fractions of the components were

| UHMWPE | 65% |
| Composite filler | 35% |
| STATEX G | 0% |

The product had a resistivity of about 400 ohm-cm at 23° C., about 1,300 ohm-cm at 112° C. and about 9,000 at 120° C.

EXAMPLE 11

A composite filler was prepared in a Brabender mixer by melt-blending 56 wt % Marlex 50100, 43 wt % Statex GH (carbon black available from Columbian Chemicals) and 1 wt % antioxidant with 5% by weight of the polymer/carbon black total of Luperco 130XL (a chemical cross-linking agent containing peroxide available from Pennwalt Corporation). The mixture was crosslinked by heating at 200° C. for 30 minutes and was then ground to produce particles smaller than 250 microns. Three different formulations, A, B, and C, comprising 28, 30, and 32 wt % particulates, respectively, were made by mixing the particulates with Petrothene NA 140. Each composition was extruded into a tubular geometry with an inner diameter of 0.59 inch (1.5 cm) and a wall thickness of approximately 0.10 inch (0.25 cm). After irradiating each tube to a level consistent with an $M_{100}$ value of 25 psi, each tube was pneumatically expanded to various ratios up to 3× expansion. When tested on a 15 KV cable, each expanded tube showed the ability to withstand 110 KV transient impulses. The non-linear behavior as a function of increasing electrical stress is shown in the following data:

| Composition | | A | B | C |
|---|---|---|---|---|
| Particulate loading, wt % | | 28 | 30 | 32 |
| Specific Impedance @ 2 KV (ohm-cm) | | | | |
| Expansion: | 1.00× | 1.82E + 9 | 1.08E + 9 | 2.09E + 9 |
| | 1.29× | 2.97E + 9 | 2.59E + 9 | 2.61E + 9 |
| | 1.41× | 2.72E + 9 | 2.71E + 9 | 1.74E + 9 |
| | 1.61× | 1.96E + 9 | 1.62E + 9 | 1.78E + 9 |
| Specific Impedance (ohm-cm) Electrical Stress (KV/mm) | | | | |
| 0.0348 | | 8.17E + 8 | 1.03E + 9 | 1.06E + 9 |
| 0.0696 | | 6.90E + 8 | 1.03E + 9 | 9.75E + 8 |
| 0.1043 | | 5.30E + 8 | 1.03E + 9 | 9.40E + 8 |
| 0.1217 | | 4.64E + 8 | 9.17E + 8 | 8.70E + 8 |
| 0.1391 | | 2.37E + 8 | 7.77E + 8 | 8.00E + 8 |
| 0.16 | | 1.44E + 8 | 5.61E + 8 | 7.36E + 8 |

EXAMPLE 12

A composite filler was made by blending 50 wt % Marlex 50100, 49 wt % Statex GH, and 1 wt % antioxidant in a Banbury mixer and pelletizing the composition. The pellets were dry-blended with 5 wt % Luperco 130XL and then were melt-mixed in a Banbury mixer at high speed. After 10 minutes, a large drop in the current of the mixer motor was observed. At this point, the composition was removed from the mixer as small fragments. (Testing of the fragments indicated that they were crosslinked; the peroxide reactions were complete). The fragments were ground into particulates smaller than 250 microns. Various compounds containing 30 to 70 wt % particulates in Marlex 50100 were made. At 36 wt % particulates, one composition had a resistivity of approximately 150,000 ohm-cm.

EXAMPLE 13

A composite filler was made by blending 46 wt % Marlex 50100, 43 wt % Statex GH, 10 wt % Tipure (titanium dioxide pigment available from New England Resins and Pigments), and 1 wt % antioxidant in a Brabender mixer. The mixture was pelletized and the pellets were irradiated to a dose of 80 Mrad before grinding into particles smaller than 250 microns. The presence of the titanium dioxide made the mixture easier to grind.

We claim:

1. A composition which comprises
   (a) a continuous matrix comprising a first organic polymer, and
   (b) a first particulate conductive filler (i) which is distributed in the matrix and maintains its identity therein; (ii) each particle of which comprises a crosslinked second organic polymer, and a second particulate conductive filler which is distributed in the second polymer, and (iii) which has been prepared by a process which comprises cross-linking the second organic polymer under dynamic mixing conditions in the presence of the second particulate filler.

2. A composition according to claim 1 wherein the second polymer is polyethylene.

3. A composition according to claim 2 wherein the first polymer is polyethylene.

4. A composition according to claim 1 wherein the first particulate conductive filler has been crosslinked by means of a chemical cross-linking agent.

5. A composition according to claim 4 wherein the chemical cross-linking agent comprises peroxide.

6. A composition according to claim 4 wherein the first particulate conductive filler has been prepared by a process in which there is used at least 3% by weight of the cross-linking agent, the percentage being based on the total weight of the composition being crosslinked.

7. A composition according to claim 6 wherein at least 4% of the chemical cross-linking agent is used.

8. A composition according to claim 7 wherein at least 5% of the chemical cross-linking agent is used.

9. A process for the preparation of a composition which comprises
   (a) a continuous matrix comprising a first organic polymer, and
   (b) a first particulate conductive filler which is distributed in the matrix and maintains its identity therein, and each particle of which comprises a crosslinked mixture of a second organic polymer and a second particulate conductive filler which is distributed in the second polymer;
   which process comprises
   (1) mixing the second organic polymer with the second particulate conductive filler and a chemical cross-linking agent under a dynamic mixing condition which (i) disperses the second particulate conductive filler in the second organic polymer, (ii) crosslinks the second organic polymer, and (iii) results in the formation of the first particulate conductive filler; and
   (2) dispersing the crosslinked first particulate conductive filler from step (1) in the first organic polymer.

10. A process according to claim 9 wherein the particulate filler from step (1) is further comminuted prior to dispersion in step (2).

11. A process according to claim 9 wherein there is used at least 3% by weight of the cross-linking agent, the percentage being based on the total weight of the composition being crosslinked.

12. A process according to claim 11 wherein at least 4% of the chemical cross-linking agent is used.

13. A process according to claim 12 wherein at least 5% of the chemical cross-linking agent is used.

14. A process according to claim 9 wherein the mixing under dynamic mixing conditions in step (1) is achieved by means of high shear mixing equipment.

15. A process for the preparation of a composition which comprises
   (a) a continuous matrix comprising a first organic polymer, and
   (b) a first particulate conductive filler which is distributed in the matrix and maintains its identity therein, and each particle of which comprises a crosslinked mixture of a second organic polymer and a second particulate conductive filler which is distributed in the second polymer;
   which process comprises
   (1) dispersing the second particulate conductive filler in the second organic polymer;
   (2) forming the dispersion of step (1) into pellets;
   (3) blending the pellets of step (2) with a chemical cross-linking agent and mixing the blend under dynamic mixing conditions which crosslink the second organic polymer and result in the formation of the first particulate conductive filler; and
   (4) dispersing the crosslinked first particulate conductive filler from step (3) in the first organic polymer.

16. A process according to claim 15 wherein there is used at least 3% by weight of the cross-linking agent, the percentage being based on the total weight of the composition being crosslinked.

17. A process according to claim 16 wherein at least 4% of the chemical cross-linking agent is used.

18. A process according to claim 17 wherein at least 5% of the chemical cross-linking agent is used.

19. A process for the preparation of a composition which comprises
   (a) a continuous matrix comprising a first organic polymer, and
   (b) a first particulate conductive filler which is distributed in the matrix and maintains its identity therein, and each particle of which comprises a mixture of (i) a second organic polymer, (ii) a second particulate conductive filler which is distributed in the second polymer, and (iii) an inert particulate filler which is distributed in the second polymer;
   which process comprises
   (1) dispersing the second particulate conductive filler and the inert particulate filler in the second organic polymer;
   (2) melt-blending the dispersion from step (1);
   (3) cross-linking and comminuting the mixture from step (2) to form the first particulate conductive filler; and
   (4) dispersing the comminuted mixture from step (3) in the first organic polymer.

20. A process according to claim 17 wherein the inert particulate filler comprises titanium dioxide.

21. A process according to claim 17 wherein the inert particulate filler comprises zinc oxide.

* * * * *

UNITED STATES PATENT AND TRADEMARK OFFICE
CERTIFICATE OF CORRECTION

PATENT NO. : 5,106,538                                Page 1 of 2
DATED      : April 21, 1992
INVENTOR(S): Barma et al It is certified that error appears in the above-indentified patent and that said Letters Patent is hereby corrected as shown below:

Title page, Attorney, Agent or firm line 2, replace "Marquerite" by --Marguerite--.

Title page, item [56] Foreign Patent Documents, page 2, column 2, line 1, replace "59-122524  7/1984  Japan" by --57-228128 Japan--.

Abstract item [57], line 19, replace "reproduceability." by --reproducibility.--.

Abstract item [57], line 22, replace "composition" by --compositions--.

Column 1, line 28, replace "{this" by --(this--.

Column 2, lines 4 to 5, after "061,353 (McMills)," insert --now abandoned,--.

Column 2, line 5, replace "064,354" by --061,354--.

UNITED STATES PATENT AND TRADEMARK OFFICE
CERTIFICATE OF CORRECTION

PATENT NO. : 5,106,538
DATED : April 21, 1992
INVENTOR(S) : Barma et al

It is certified that error appears in the above-indentified patent and that said Letters Patent is hereby corrected as shown below:

Column 7, line 44, replace "103" by --$10^3$--.

Column 9, line 35, replace "reproduceable" by --reproducible--.

Column 11, line 60, replace "flow" by --blow--.

Column 17, lines 51, 52 and 56, replace "2" by --7--.

Col. 22, claim 20, line 64, replace "17" by --9--

Col. 22, claim 21, line 66, replace "17" by --9--

Signed and Sealed this

Seventh Day of December, 1993

Attest:

BRUCE LEHMAN

Attesting Officer — Commissioner of Patents and Trademarks